Feb. 18, 1969  C. HOLM  3,428,016
AMPHIBIOUS COMMERCIAL-TYPE MOTOR VEHICLE
Filed Feb. 10, 1967

INVENTOR
CHRISTIAN HOLM

BY  *Dicke & Craig*
ATTORNEYS

United States Patent Office 3,428,016
Patented Feb. 18, 1969

3,428,016
AMPHIBIOUS COMMERCIAL-TYPE MOTOR VEHICLE
Christian Holm, Backnang, Germany, assignor to Daimler-Benz Aktiengesellschaft, Stuttgart-Unterturkheim, Germany
Filed Feb. 10, 1967, Ser. No. 615,181
Claims priority, application Germany, Feb. 12, 1966, D 49,352
U.S. Cl. 115—1         24 Claims
Int. Cl. B60f 3/00; B63h 5/00, 25/42

ABSTRACT OF THE DISCLOSURE

An amphibious commercial-type motor vehicle which, in addition to the normal driven wheels, comprises a floatable body for the payload mounted on the vehicle frame, at least two main water-propulsion devices secured at frame parts near the stern or rear end of the vehicle which are adapted to be selectively engaged and disengaged from their power transmitting connection, and at least one auxiliary water-propulsion device adapted to be pivoted about an essentially vertical axis and arranged near the bow or front end of the vehicle, and in which the bow and stern sections of the vehicle body are inclined so as to form a predetermined free angle of approach with respect to the floor or ground level. The auxiliary propulsion device is additionally adapted to be retracted, when normally driving on ground, into a position, in which it does not impair the over-hang angle or angle of approach between the bow section of the vehicle and the ground level.

Background of the invention

Figure 1:
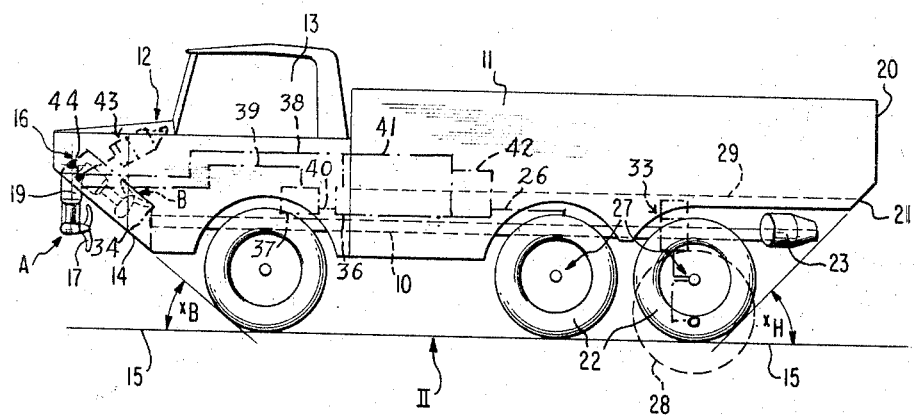

The present invention relates to an amphibious commercial-type motor vehicle equipped with a main water propulsion system for the propulsion during water travel, on whose frame is adapted to be installed a floating body or floatable structure for the payload which provides for buoyancy during water travels, and in which the vehicle bow or front section and vehicle stern or rear section are each inclined with respect to the ground level under a free overhand angle or free angle of approach.

In connection with the design of such types of motor vehicles uniform platform dimensions and superstructure or body dimensions as well as in particular free overhang angles have to be maintained in many cases. Frequently difficulties arise thereby to accommodate spatially the drives required for water travel. These disadvantages do not normally occur with special amphibious types of crafts as with such vehicles better spatial conditions can be created, for example, by spacious trough-like constructions.

Accordingly, the present invention relates to commercial-type motor vehicles which have been developed for economic reasons primarily for land travel but which are also suitable for water travel.

Summary of the invention

The purpose underlying the present invention essentially consists in equipping a motor vehicle of the aforementioned type in an advantageous manner, in particular for the entering and leaving maneuvers also in stronger currents.

In solution to the underlying problem, there is provided according to the present invention that at least one auxiliary water propulsion device for rudder maneuvers which is pivotally arranged about a vertical axis is arranged at the vehicle bow or front section and at least two main water propulsion devices adapted to be individually disengaged from the power-transmitting train are each secured rigidly at frame parts near the stern or rear section of the vehicle.

Several advantages are achieved by the present invention. During the transition maneuvers between land and water travel, there is always available a water propulsion to take into consideration the influences of currents on the vehicle part floating in the water, i.e., either the bow or the stern of the vehicle, when in a given case, exclusively the forward or rearward vehicle wheels are still or are already on firm ground. With the arrangement of water propulsion devices both at the bow and stern sections of the vehicle, the maneuverability of the motor vehicle is effectively improved also for travels in strong currents or only makes possible such travels. The auxiliary water propulsion device at the bow section of the vehicle can be kept small in its dimensions since the floating propulsion, properly speaking, takes place by means of the main water propulsion system in the stern section. By the use of two main water propulsion devices at the stern section, separate rudders may be dispensed with, whose accommodation is rendered difficult in particular by the free overhang angle required at the stern. Also, the two main water propulsion devices can be kept smaller in the dimensions thereof than a single water propulsion device so that the accommodation thereof as well as that of the auxiliary water propulsion device is possible also in motor vehicles of the type with which the present invention is concerned.

For purposes of maintaining the forward free overhang angle—which may be necessary, for example, for overcoming slopes of the shores or banks—provision is made in an advantageous construction of the present invention that the auxiliary water propulsion system is adapted to be moved into a position for land travel which does not constrict or impair the free overhang angle between the vehicle bow and the ground level. Appropriately, the auxiliary water propulsion system is lowerable into an aperture or recess of the vehicle bow, for example, into a cooling-air inlet aperture already present.

In order to constitute in a simple manner the connection of the driving force to the auxiliary water propulsion device which itself is mounted in a relatively complicated manner, according to a further feature of the present invention, a hydrostatic transmission may be inserted between the auxiliary water propulsion device and the associated driving source.

A space-saving accommodation of the main water propulsion devices is achieved according to a further feature of the present invention pursuant to which the housing of the main water propulsion devices near the stern of the craft approximately adjoin both the bottom of the floating body or floatable superstructure as also the plane including the free overhang angle at the stern which is formed with the ground level. With such an advantageous arrangement of the main water propulsion devices, a particularly compact construction is made possible for the floatable motor vehicle.

With conventional motor vehicles having separate frame and float or body constructions, it is common that at least a part of the floating body or of the floatable structure projects beyond the frame on both sides transversely to the vehicle longitudinal direction. In the application of the present invention to such types of motor vehicle, one main water propulsion device each may be arranged below the respective projecting floating body or structure on each side of the frame. This results in a simple, lowloss water supply to these water propulsion devices. The same purpose is pursued by a further measure which is characterized according to the present invention in that the rear vehicle wheels—which, with an arrangement of the main water propulsion devices near the stern, may be provided between the latter and the vehicle bow and might impair the approach flow to the water propulsion devices at the stern with a maximum dimension of the wheel base—are adapted to be moved from the normal position used during land travel into a position for water travel which does not impair or impairs only negligibly the flow of water to the main water propulsion devices at the stern of the vehicle.

The maneuverability of the motor vehicle during water travels is effectively improved according to a further development of the present invention in that each main water propulsion is arranged obliquely to the travel direction in such a manner that its impulse or momentum magnitude effecting the movement of the motor vehicle is inclined to the vertical vehicle longitudinal center plane. A larger lever arm of this impulse or momentum magnitude with respect to the center of gravity of the motor vehicle is realized thereby than if the water propulsion device is arranged parallel to the vehicle longitudinal axis in its effective direction.

The maneuverability of the motor vehicle in water is still further improved according to the present invention if a change-speed transmission—especially with a stepless change in rotational speed—is arranged in the power train or force-transmission connection between at least one main water propulsion device and its driving source.

Accordingly, it is an object of the present invention to provide an amphibious commercial-type motor vehicle of the type described above which is simple in construction and effectively eliminates the aforementioned shortcomings and drawbacks encountered with the prior art constructions.

Another object of the present invention resides in an amphibious, commercial-type motor vehicle capable of carrying a payload which is designed primarily for land travel but which may be used with great effectiveness also in water travel.

A further object of the present invention resides in an amphibious vehicle of the type described above which excels by maneuverability, simplicity in design, and relatively low cost in construction.

Still a further object of the present invention resides in an amphibious, commercial-type motor vehicle which dispenses with the need of separate rudders yet effectively utilizes the propulsion in the water for steering purposes without impairment of its effectiveness owing to flow losses as a result of the presence of the rear driving wheels.

Figure 2:
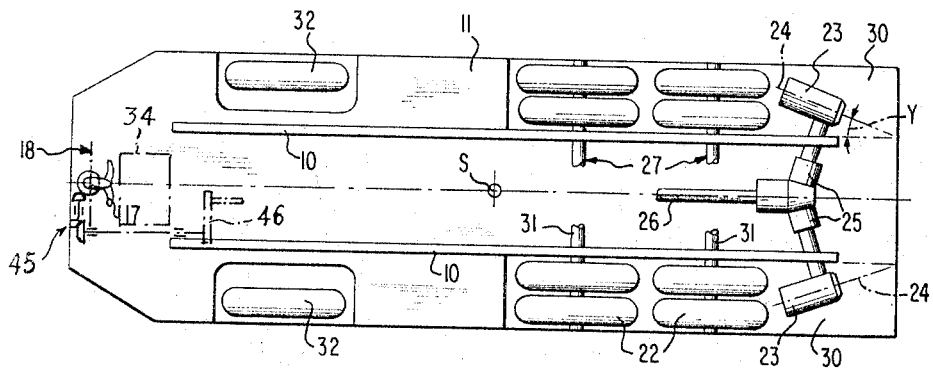

These and further objects, features, and advantages of the present invention will become more obvious from the following description when taken in connection with the accompanying drawing which shows, for purposes of illustration only, one embodiment in accordance with the present invention, and wherein:

FIGURE 1 is a schematic side-elevational view of a floatable motor vehicle schematically illustrating exclusively those details necessary for an understanding of the present invention; and FIGURE 2 is a bottom plan view taken in the direction of arrow II of FIGURE 1, in which the illustration is limited primarily to the frame, body and water propulsion systems of the motor vehicle.

Referring now to the drawing wherein like reference numerals are used throughout the two views to designate like parts, a body or superstructure 11 capable of floating is mounted or placed securely on the frame 10 of the motor vehicle for purposes of water travel. In case of exclusive overland travels, the superstructure 11 can be replaced by a conventional platform or the like customary with commercial-types of vehicles, such as trucks. A driver cab indicated by reference numeral 13 is provided in the bow or front section generally designated by reference numeral 12 of the floatable motor vehicle. The forward boundary wall 14 of the vehicle bow 12 subtends with the ground level indicated by reference numeral 15 a free overhang angle $X_B$ which may amount, for example, to 45°.

An auxiliary water propulsion device 17 for rudder maneuvers which is pivotal about a vertical axis 16 is arranged in the vehicle bow 12; the auxiliary propulsion system 17 may be of any conventional construction and may be pivoted from the illustrated full-line position A for water travel about a horizontal cross axis 18 (FIGURE 2) into a position B for land travel, indicated in dash lines. Pivot bearing 44, secured to a fixed part of the vehicle is provided for the purpose of facilitating the pivoting of auxiliary propulsion system 17 into positions A and B and pressure medium operating cylinder 43, which effects the pivoting motion, is pivotably secured at the housing of the auxiliary propulsion system. In the position B the auxiliary water propulsion device 17 frees the entire overhang angle $X_B$ so that the vehicle can also overcome steep slopes at banks or shores when emerging from the water. The auxiliary water propulsion device 17 forms, together with a hydrostatic motor 19, a pivotally suspended structural unit which may be operatively connected with a hydrostatic pump 36 driven by the driving engine 41 by way of movable or flexible lines for the hydraulic medium. As shown in dash lines in FIGURE 1, a pressure line 38 connects hydrostatic motor 19 with pump 36, which in turn is connected to a hydrostatic pressure medium container 37 by means of pressure line 40. A return line 39 connects hydrostatic motor 19 to container 37.

In the position B (FIGURE 1), the auxiliary water propulsion device 17 is accommodated in a conventional manner (not illustrated in the drawing) in a forward aperture or recess 34 of the bow 12, for example, in a cooling-air inlet aperture (not shown), so that the floating volume of the vehicle bow 12 constructed also as floating body is not reduced essentially by the retraction of the water propulsion device 17 into the same. Auxiliary propulsion system 17 may also be pivoted about the perpendicular axis 16 by means of a hand-wheel 46 coupled, via a bevel gear drive system 45, with the housing of propulsion system 17.

The vehicle stern or rear section 20 is provided with a rearward inclined end wall 21 which subtends a free overhang angle $X_H$ with the ground level 15 that may also amount, for example, to 45°.

The bottom of the floatable superstructure 11 is indicated in FIGURE 1 at 29 in dash lines and includes parts 30 which project beyond the frame 10 transversely to the vehicle longitudinal axis. Directly below these projecting cantilever parts 30 two main water propulsion devices 23 are rigidly secured at the stern ends of the frame 10. One main water propulsion device 23 is thereby arranged on each side of the frame 10 whose housing adjoins that plane which together with the rear wall 21 is inclined under the free stern overhang angle $X_H$ with respect to the ground 15. The resultant 24 from the driving impulses of each stern water propulsion device 23 is inclined with respect to the vertical vehicle longitudinal center plane under an acute angle by opening in the direction toward the center of gravity S of the vehicle so that for each main water propulsion device 23 a large effective lever arm results during a rudder maneuver. Each main water propulsion device 23 is connected for purposes of carrying out this rudder maneuver with a power-transmitting train or connection 26 by way of a respective engageable and disengageable clutch 25 which power transmitting train 26 leads to a conventional driving source 41. For purposes of increasing the maneuverability of the motor vehicle during water travel, it is of advantage if a change-speed transmission 42, especially with stepless change in rotational speeds, is provided in the power-transmitting train 26.

The vehicle wheels 22 of the double axle unit 27 are arranged at the stern of the vehicle in front of the main water propulsion devices 23 as viewed in the direction toward the vehicle bow 12. For purposes of improving the approach flow conditions in front of the main water propulsion devices 23, the vehicle wheels 22 may be pivoted with respect to the frame 10 into a position for water travel indicated in FIGURE 1 in dash lines by reference numeral 28.

Since the details thereof are readily within the scope of a person skilled in the art and therefore not illustrated in the drawing, the vehicle wheels 22 inclusive the two appertaining drive axis or shafts 31 may be supported in a conventional manner for this purpose on an auxiliary frame of any suitable construction which is pivotally secured at the main frame 10. The swinging or pivoting movements of the auxiliary frame may be produced, for example, by an auxiliary force such as a servo force generated by a pressure medium operating cylinder 33 and may be controlled in any suitable manner from the driver cab 13.

During entry into a flowing water, the auxiliary water propulsion device 17 is turned on after the immersion of the bow and is pivoted in such a manner that a driving moment on the bow against the water flow or current results and drifting of the bow is prevented.

During water travels, i.e, when the entire vehicle floats, the two main water propulsion devices 23 are turned on additionally. In case of failure of the auxiliary water propulsion device 17, the vehicle can still be steered with the aid of the two main water propulsion devices 23.

When leaving flowing water, i.e. a water stream or current, the auxiliary water propulsion device 17 remains engaged until shortly prior to leaving the water and aids the rudder maneuvers in order to be able to steer the vehicle into a position perpendicular to the shore or bank. The main water propulsion devices 23 produce the required thrust in order to bring the driven front wheels 32 to firm shore or ground.

If the stern of the vehicle should be deflected by the current, when the front wheels 32 are already supported on firm ground, then the vehicle can be brought back into its position perpendicular to the shore or bank by the rudder maneuver of the two or of one of the two main water propulsion devices.

While I have shown and described one embodiment in accordance with the present invention, it is understood that the same is not limited thereto but is susceptible of numerous changes and modifications as known to a person skilled in the art, and I therefore do not wish to be limited to the details shown and described herein, but intend to cover all such changes and modifications as are encompassed by the scope of the appended claims.

I claim:

1. An amphibious commercial-type motor vehicle, comprising frame means, floatable superstructure means mounted on said frame means, main water propulsion means for the movement during water travel including at least two main water propulsion devices rigidly secured to the vehicle near the stern thereof, at least one auxiliary water propulsion means pivotally mounted about an approximately vertical axis in the bow section of the vehicle, said auxiliary water propulsion means also being pivotally-mounted about an approximately horizontal axis, thus adapting said auxiliary water propulsion means to be retracted into an aperture provided in the vehicle bow, wherein the bow and stern sections of the vehicle are inclined with respect to the ground at a free overhang angle.

2. An amphibious vehicle according to claim 1, further comprising means for individually and selectively engaging and disengaging each of the two main water propulsion devices.

3. A motor vehicle according to claim 2, further comprising means to enable pivoting of the auxiliary water propulsion means into a position for land travel in which the free overhang angle between the vehicle bow and the ground is substantially unimpaired.

4. A motor vehicle according to claim 1, wherein said aperture is a cooling air inlet aperture.

5. A motor vehicle according to claim 4, further comprising a hydrostatic transmission operatively connected in the power transmission connection between the auxiliary water propulsion means and the respective driving source, 6. A motor vehicle according to claim 5, wherein the main water propulsion devices include housing means adjoining closely both the bottom of the floatable superstructure means as also the plane including the free overhang angle with the level of the vehicle stern.

7. A motor vehicle according to claim 6, in which at least a portion of the floatable superstructure means projetcs beyond the frame means on both sides transversely to the vehicle longitudinal direction, one main water propulsion device each being arranged on both sides of the frame means below the respective projecting part of the floating superstructure means.

8. A motor vehicle having rear wheel means, according to claim 7, further comprising rear wheel means, and means for moving the rear wheel means from the normal position for land travel into a position for water travel in which said rear wheel means at most only slightly impair the flow of water to the main water propulsion devices.

9. A motor vehicle according to claim 8, wherein each main water propulsion device is arranged obliquely to the driving direction in such a manner that the impulse magnitude effecting the propulsion of the vehicle is inclined to the vertical vehicle longitudinal center plane.

10. A motor vehicle according to claim 9, further comprising change-speed gear means connected in the power transmitting train between at least one main water propulsion device and its respective driving source.

11. A motor vehicle according to claim 10, wherein said change-speed gear means is a stepless change-speed transmission.

12. A motor vehicle according to claim 1, further comprising means to enable pivoting of the auxiliary water propulsion means into a position for land travel in which the free overhang angle between the vehicle bow and the ground is substantially unimpaired.

13. A motor vehicle according to claim 12, wherein the auxiliary water propulsion means is adapted to be retracted into an aperture of the vehicle bow.

14. A motor vehicle according to claim 1, further comprising a hydrostatic transmission operatively connected in the power transmission connection between the auxiliary water propulsion means and the respective driving source.

15. A motor vehicle according to claim 1, wherein the main water propulsion devices include housing means adjoining closely both the bottom of the floatable superstructure means as also the plane including the free overhang angle with the level of the vehicle stern.

16. A motor vehicle according to claim 1, in which at least a portion of the floatable superstructure means projects beyond the frame means on both sides transversely to the vehicle longitudinal direction, one main water propulsion device each being arranged on both sides of the frame means below the respective projecting part of the floating superstructure means.

17. A motor vehicle having rear wheel means, according to claim 1, further comprising rear wheel means, and means for moving the rear wheel means from the normal position for land travel into a position for water travel in which said rear wheel means at most only slightly impair the flow of water to the main water propulsion devices.

18. A motor vehicle according to claim 1, wherein each main water propulsion device is arranged obliquely to the driving direction in such a manner that the impulse magnitude effecting the propulsion of the vehicle is inclined to the vertical vehicle longitudinal center plane.

19. A motor vehicle according to claim 1, further comprising change-speed gear means connected in the power transmitting train between at least one main water propulsion device and its respective driving source.

20. A motor vehicle according to claim 19, wherein said change-speed gear means is stepless change-speed transmission.

21. A motor vehicle according to claim 15, further comprising means to enable pivoting of the auxiliary water propulsion means into a position for land travel in which the free overhang angle between the vehicle bow and the ground is substantially unimpaired.

22. A motor vehicle according to claim 21, wherein the auxiliary water propulsion means is adapted to be retracted into an aperture of the vehicle bow.

23. A motor vehicle according to claim 19, further comprising a hydrostatic transmission operatively connected in the power transmission connection between the auxiliary water propulsion means and the respective driving source.

24. A motor vehicle having rear wheel means, according to claim 23, further comprising rear wheel means, and means for moving the rear wheel means from the normal position for land travel into a position for water travel in which said rear wheel means at most only slightly impair the flow of water to the main water propulsion devices.

References Cited

UNITED STATES PATENTS

| | | | |
|---|---|---|---|
| 2,406,290 | 8/1946 | Hait | 115—1 |
| 2,735,393 | 2/1956 | White | 114—147 |
| 3,027,862 | 4/1962 | Votre | 115—1 |
| 3,176,585 | 4/1965 | Ruf | 115—1 |
| 3,188,996 | 6/1965 | Thompson | 115—1 |

ANDREW H. FARRELL, *Primary Examiner.*

U.S. Cl. X.R.

114—148